US009094342B2

(12) United States Patent
So et al.

(10) Patent No.: US 9,094,342 B2
(45) Date of Patent: Jul. 28, 2015

(54) METHOD AND SYSTEM FOR SHARING ROUTER RESOURCES VIA A MOBILE VIRTUAL ROUTER

(75) Inventors: Ning So, Plano, TX (US); Andrea Fumagalli, Dallas, TX (US); Yuhua Chen, Houston, TX (US)

(73) Assignees: Verizon Patent and Licensing Inc., Basking Ridge, NJ (US); Board of Regents, The University of Texas System, Austin, TX (US); University of Houston System, Houston, TX (US)

( * ) Notice: Subject to any disclaimer, the term of this patent is extended or adjusted under 35 U.S.C. 154(b) by 321 days.

(21) Appl. No.: 13/349,736

(22) Filed: Jan. 13, 2012

(65) Prior Publication Data

US 2013/0185432 A1     Jul. 18, 2013

(51) Int. Cl.
*G06F 13/00*     (2006.01)
*H04L 12/713*     (2013.01)
*H04L 12/703*     (2013.01)

(52) U.S. Cl.
CPC ............... *H04L 45/586* (2013.01); *H04L 45/28* (2013.01)

(58) Field of Classification Search
CPC .............................. H04L 45/586; H04L 45/28
USPC .......... 709/226, 238, 220–222, 223; 718/105, 718/104, 102, 100
See application file for complete search history.

(56) References Cited

U.S. PATENT DOCUMENTS

| | | | | |
|---|---|---|---|---|
| 7,415,507 | B1 * | 8/2008 | Ward et al. ..................... | 709/217 |
| 8,223,760 | B2 * | 7/2012 | Ward et al. ..................... | 370/387 |
| 8,560,658 | B2 * | 10/2013 | Bedare et al. .................. | 709/223 |
| 2008/0304426 | A1 * | 12/2008 | Ward et al. ..................... | 370/254 |
| 2009/0046622 | A1 * | 2/2009 | Hua .............................. | 370/315 |
| 2011/0238793 | A1 * | 9/2011 | Bedare et al. .................. | 709/220 |
| 2013/0054763 | A1 * | 2/2013 | Van der Merwe et al. .... | 709/220 |
| 2013/0182574 | A1 * | 7/2013 | So et al. ......................... | 370/236 |
| 2013/0182605 | A1 * | 7/2013 | So et al. ......................... | 370/254 |
| 2013/0182606 | A1 * | 7/2013 | So et al. ......................... | 370/254 |

* cited by examiner

*Primary Examiner* — Kenneth R Coulter

(57) ABSTRACT

An approach is provided for creating a single mobile virtual router (MVR) to share pooled resources. A mobile virtual router is formed to utilize resources of multiple routers of a network, wherein the routers include one or more physical routers, one or more virtual routers, one or more other mobile virtual routers, or a combination thereof. The resources of the single mobile virtual router are dynamically partitioned in response to an operational criterion of the network.

17 Claims, 10 Drawing Sheets

US 9,094,342 B2

METHOD AND SYSTEM FOR SHARING ROUTER RESOURCES VIA A MOBILE VIRTUAL ROUTER

BACKGROUND INFORMATION

With the increase in demand for broadband communications and services, telecommunication service providers are continually challenged to provide the fastest and most reliable service to their customers to accommodate a wide variety of applications and services. Not surprisingly, a vast interconnection of data networks has emerged to support these applications and services. However, traditionally, such networks are static, in terms of allocation of network resources. In other words, any fluctuation or variation in resource demand can undermine statically engineered network resources. A key factor in the variability of network resources is the fact that user devices (e.g., smartphones, laptops, tablet computers, etc.) are mobile in nature, and thereby imposes variable demand on the network depending on the mobility of the users. Such mobility can be unpredictable, and thus, static network architectures are ill-suited.

Furthermore, system resources, such as physical router resources, are not well-balanced when the complexities of mobility are introduced. Each physical router has a finite set of resources, which can include central processing unit (CPU) cycles, memory, Input/Output (I/O) interfaces, etc. It is not uncommon for a router to be declared "exhausted" when one or more of these resources reached their limit or capacity. For example, a router's memory can be fully depleted because one of its customers has a very large routing table, or a router's CPU cycle time can be exhausted (high CPU utilization) because it is running a high maintenance routing protocol. In such cases, the router may have plenty of other resources (e.g., I/O interfaces) that remain unused. However, these resources cannot be made available with traditional systems.

Therefore, there is a need for an approach to accommodate the mobile nature of sophisticated services and applications and to more efficiently utilize system resources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for forming of a single mobile virtual router spanning across more than one physical router are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring of the preferred embodiments of the invention.

Although various exemplary embodiments are described with respect to networks that carry data packets using Multi-protocol Label Switching (MPLS) technology, it is contemplated that various exemplary embodiments are applicable to other equivalent systems and traffic flows.

Figure 1:
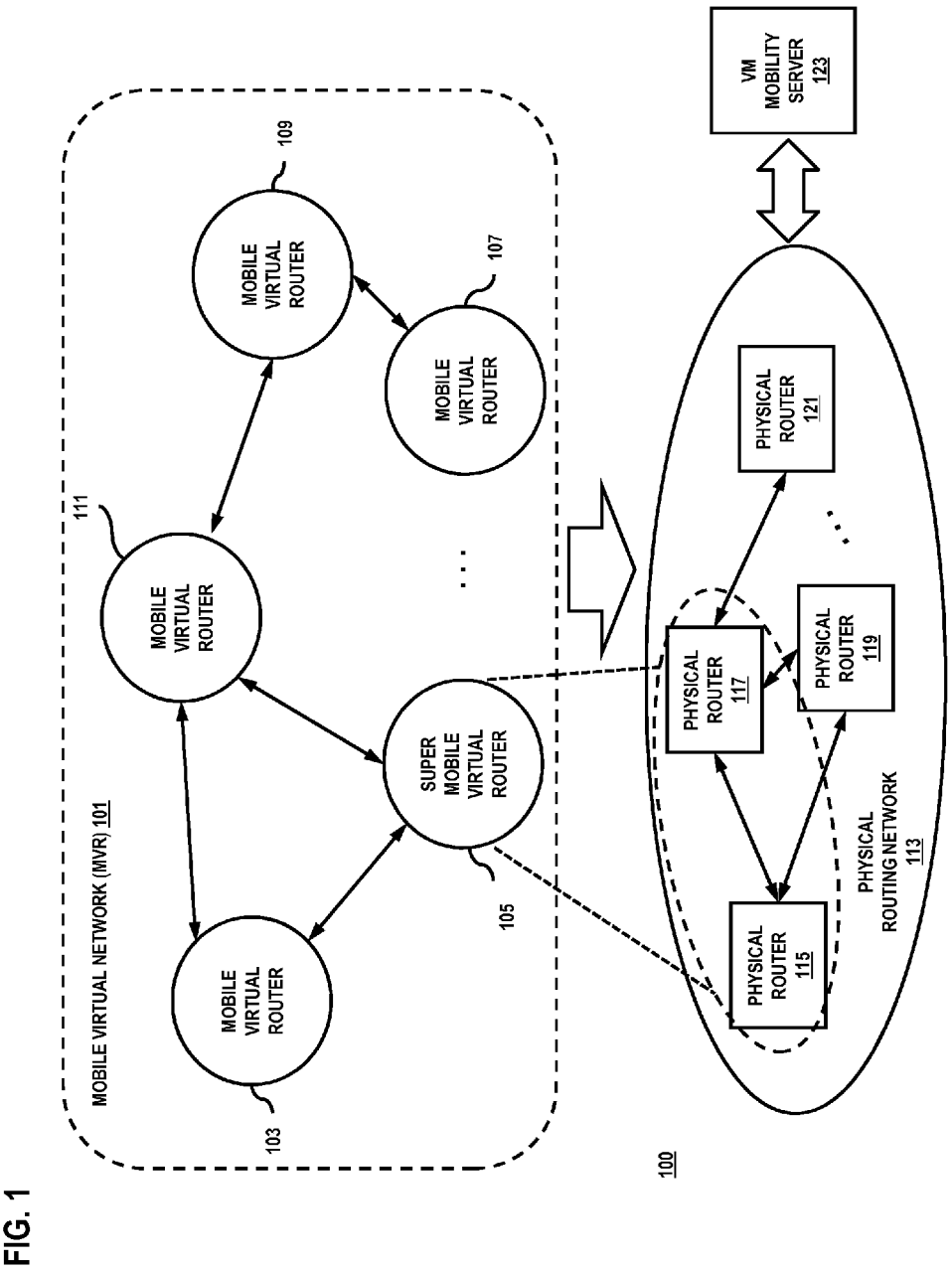
FIG. 1 is a diagram of a mobile virtual network capable of dynamically adapting, according to one embodiment.

FIG. 1 is a diagram of a mobile virtual network capable of dynamically adapting, according to one embodiment. For the purpose of illustration, system 100 includes a mobile virtual network 101 that employs one or more mobile virtual routers (MVRs) 103-111. Under this scenario, mobile virtual network 101 can be effectively implemented or overlaid onto a physical routing network 113, which comprises one or more physical routers 115-121. As shown, a virtual machine (VM) mobility server 123 communicates with the physical routing network 113, among other functions, to create and tear down the mobile virtual network 101. Mobile virtual network 101 is thus a virtual network that can be created by the mobile virtual routers 103-111, and can move/migrate/adapt using mobile virtual routers 103-111 as the event participants/virtual servers move. MVRs 103-111 can be created and/or changed using underlining physical routers' available resources. Thus, MVRs 103-111 may grow or shrink during their lifetime. According to one embodiment, MVR 105 is configured as a super MVR, whereby the resources of multiple physical routers (e.g., routers 115 and 117) are shared. More specifically, mobile virtual routers (MVR) residing on different physical routers can be virtually grouped together to form and behave as a single MVR. In other words, the physical resources on the different, distinct routers 115 and 117 can be pooled together, dynamically partitioned, and used to achieve improved operational performance and efficiency.

In certain embodiments, MVRs 103-111 can be configured/auto-configured to move from one physical router (e.g., router 115) to another physical router (e.g., router 117) without service and traffic interruption. Traditionally, virtual routers can be hardware-based virtual router (HVR) or software-based virtual router (SVR). HVR typically refers to multiple virtual routers that share the same physical chassis and some common supporting resources, such as power supply, cooling, management port, switching fabric, and so on. However, critical control plane and forwarding plane resources (sometimes even management plane resources) are not shared. For example, the typical control plane resources that are not shared include central processing unit (CPU) (primary and back-up) and memory. The typical forwarding plane resources that are not shared include interface cards and backplane cards that support plug-in interface cards. SVR typically refers to multiple virtual routers that share all the physical resources available in the physical router. The only separation of the SVRs is the separation of virtual resources. For example, each SVR has separate control plane in the form of routing information database (routing tables); separate forwarding plane in the form of forward information databases (logical interface tables and, e.g., IGP/TE databases); and separate management plane (security and user control, system log, monitoring and reporting, and so on).

Under existing approaches, HVR and SVR technologies are not mobile—meaning that they are statically provisioned and activated on an existing physical router. Furthermore, HVR and SVR are typically a subset of a single physical router; that is, each physical router can have one or more HVRs and/or SVRs, but not the converse. Namely, the HVRs and/or SVRs cannot be associated with multiple routers.

Each of the MVRs 103-111 is hybrid virtual router, and can be backward compatible with existing router technologies, e.g., HVR, SVR. Details of a mobile virtual router are more fully described with respect to FIG. 2. Unlike HVRs and SVRs, MVR (e.g., any one of routers 103-111) is highly dynamic, and flexible. MVRs 103-111 can, for instance, readily support and enable a variety of network operations that are required in cloud architectures as well as the evolving global Internet.

The above arrangement, according to certain embodiments, can provide self-configuration, traffic congestion avoidance under multiple failures conditions, scaling of MVR to accommodate application types, as well as performance optimization. Regarding self-configuration of a newly created network (e.g., MVN 101), the MVR can be the foundation of an application driven network. In this manner, the network 101 can be built (along with the services being provisioned) by an application on demand. With respect to traffic congestion avoidance, MVR can be used to alter the logical topology of the network 101, creating local equal-cost multipath (ECMP) conditions during the multiple failures conditions. Consequently, the resulting traffic congestions can be minimized. With the continuous broadening of application types and the widening range of their related performance (in terms of bandwidth and other network resources that are required to support them), MVRs can be custom created to best support these applications. Small MVRs can be created as needed, by reserving a small fraction of one physical router's resources. Large MVRs can be created where and as needed, by combining together reserved resources belonging to a number of physical routers. As a result, physical router resources are more effectively utilized, especially the control plane resources such as CPU and memory. MVRs enable performance optimization in the growing mobile network environment: MVR allows the network 101 to become dynamic—i.e., a moving and changing entity over time. These network changes, among other things, can match the network structure composed of MVRs to the mobility pattern of both users and applications (e.g., virtual machines or VMs). Moreover, such changes can best support and optimize end-to-end communication performance between mobile users and applications.

As for physical routing network 113, this network 113 can employ Multiprotocol Label Switching (MPLS) technology. This technology is based on setting up virtual paths between communication nodes (e.g., routers) in a network. MPLS provides high speed transfer of packets over data networks by appending labels to packets that contain information related to the path that the data packet will take to reach its destination. The use of such labels eliminates the need for routers to examine the header of each packet, resulting in the faster delivery of packets to their destination. The details on MPLS technology is further described in Internet Engineering Task Force (IETF) Request for Comment (RFC) 3031, which is incorporated herein in its entirety. Even though various technologies such as MPLS predominantly support fast delivery of packets, the characteristics and construction of the physical network infrastructure plays an equally vital role. Moreover, it is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast reroute (FRR) tunnels on one or more links interconnecting nodes of one or more networks (or autonomous systems). Routing protocols are utilized to determine MPLS traffic flow routes through the network 113, as well as govern the distribution of routing information between nodes 115-121.

By way of example, physical routers 115-121, as routing nodes, may include bridges, firewalls, gateways, laptop computers, mobile telephones, personal digital assistants, personal computers, routers, set top boxes, servers, switches, video game devices, workstations, or any other suitable device, customer premise equipment, etc., capable of routing functions, such as layer three routing (or data transfer) functions associated with the open systems interconnection (OSI) reference model. It is noted that physical routers 115-121 may route transmission units over network 113 based on one or more routing protocols, such as boarder gateway protocol (BGP), constrained shortest path first (CSPF), exterior gateway protocol (EGP), interior gateway routing protocol (IGRP), enhanced interior gateway routing protocol (EIGRP), intermediate system to intermediate system (IS-IS) protocol, routing information protocol (RIP), open shortest path first (OSPF), or any other suitable routing protocol.

Mobile virtual network 101 can provide a transport environment, in certain embodiments, for other networks (not shown). These networks may include one or more telephony networks, e.g., a circuit-switched network, such as the public switched telephone network (PSTN), an integrated services digital network (ISDN), a private branch exchange (PBX), or other like network. In other instances, such networks may also (or alternatively) include one or more wireless networks that employ one or more access technologies, such as, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. According to various embodiments, the networks may further include one or more data networks, such as one or more local area networks (LAN), metropolitan area networks (MAN), wide area networks (WAN), the Internet, or any other suitable packet-switched network, such as a commercially owned, proprietary packet-switched network having voice over internet protocol (VoIP) capabilities, e.g., a proprietary cable or fiber-optic network.

Figure 2A:
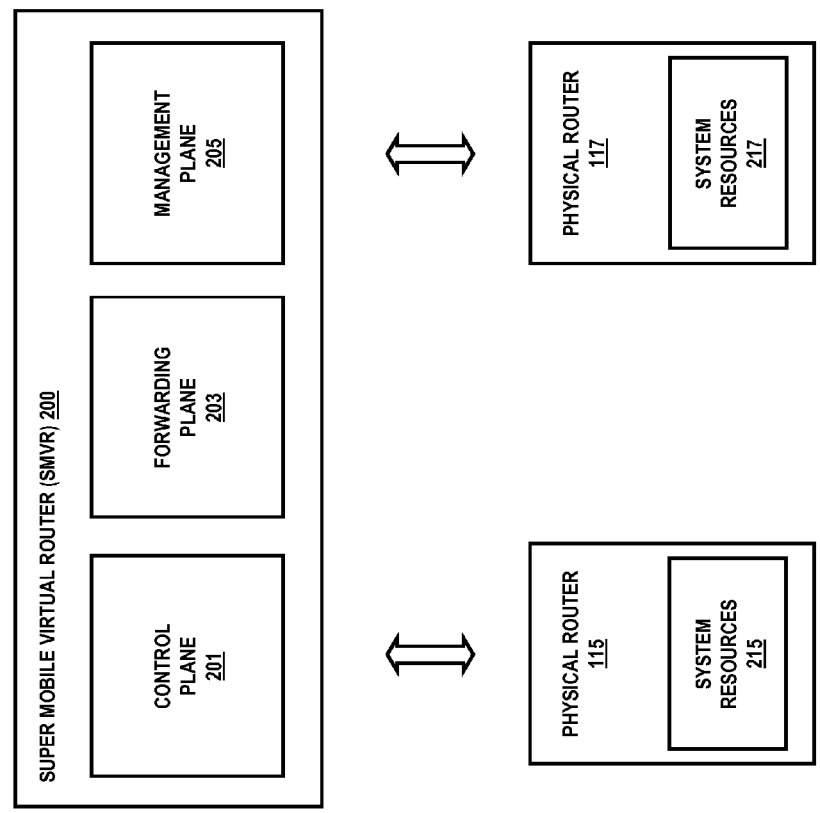
FIGS. 2A and 2B are, respectively, a diagram of a super mobile virtual router utilized in the system of FIG. 1, and a flowchart of a process for forming the super mobile virtual router, according to various embodiments.
Figure 2B:
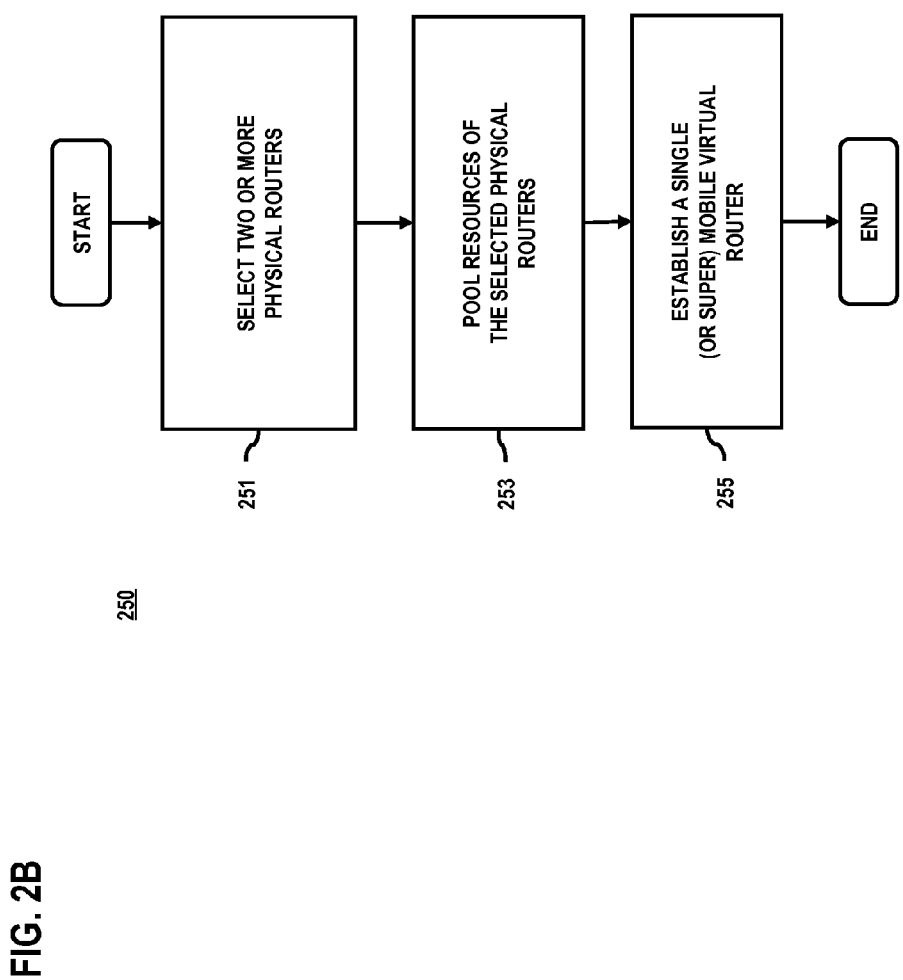

FIGS. 2A and 2B are, respectively, a diagram of a super mobile virtual router utilized in the system of FIG. 1, and a flowchart of a process for forming the super mobile virtual router, according to various embodiments. Mobile virtual router 200, in certain embodiments, includes a control plane 201, a forwarding plane 203, and a management plane 205. Unlike HVR or SVR, MVR 200 is mobile; that is, control plane 201, forwarding plane 203, and management plane 205 instances can be removed from one physical router (e.g., router 115) and replicated on a different physical router (e.g., router 117 or router 121, etc.) over time. If needed, the services and traffic carried by one MVR can be dynamically moved to the mirrored/replicated MVR without service interruption. Moreover, MVR 200 may make use of a superset of a number of physical routers 115 and 117, such that the physical resources of these routers 115 and 117 can be pooled and shared. Consequently, multiple and decentralized instances of the control plane 201, forwarding plane 203, and management plane 205 of one single MVR 200 may coexist in more than one physical router, and may utilize the physical resources (e.g., system resources 215, 217 and 221) of all those physical routers 115 and 117 simultaneously. An example of this function is one MVR (not shown) that makes use of all the physical routers 115-121 in the network (e.g., network 101). Such MVR would be denoted as a super-MVR.

It is contemplated that that pooling of resources need not be restricted to physical routers alone. In certain embodiments, a number of physical routers, virtual routers, mobile virtual routers, or a combination thereof to form a single Super-MVR. In the case of router memory exhaustion in one physical router, various routing tables can be partitioned to be stored in other physical routers that have unused memory. In fact, since multiple physical routers may have connections to the same customer router, the currently existing duplication of routing database across multiple physical routers can also be reduced to save memory space. Similarly, in the case of CPU cycle exhaustion, parallel processing may be invoked to overcome the potential congestion of the MVR by reassigning some of its CPU processing tasks to another physical router with an excess of available CPU cycles. By removing the static/physical barriers that currently exist between physical routers' resources, the creation of Super-MVRs—that include an aggregation of resources pooled together from multiple physical routers—leads to a reduction of the amount of underutilized resources in the physical routers. Consequently, super-MVRs may save the network operator significant amount of equipment capital.

Moreover, the decentralized control instances may be viewed as a single control entity to make the internal MVR structure completely transparent to other MVRs and conventional router architectures. Furthermore, these functions can be combined to jointly work in the same MVR at once. For example, the MVR control instances may first be provisioned and activated in one physical router 115. If needed, these instances can be extended to work in a decentralized way across router 115 and a second physical router 117. By way of example, at a later time, the MVR control plane instances may be restricted to run on router 117 only, thus freeing the resources 215 of physical router 115 to be used by other MVRs.

Exchange of information for coordination and data transmission between decentralized instances of the same MVR may take place using both standard and/or proprietary interfaces and protocols that are best suited for these tasks. In other words, a number of protocols can be specified and embedded into the network architecture to have the MVR dynamically set up and torn down based on the VM mobility and current location. The protocol can announce the capability of the MVR running on a given physical router to other physical routers that may host the MVR next. The announcement can also involve the MVR capability of the physical routers to form a single Super-MVR using multiple separate physical routers. This protocol can include the signaling and communication exchange between routers 115-121 in the same network 113 (autonomous system), between routers in different networks, between routers 115-121 and the VM mobility server 123, an Application Control Gateway (ACG) (not shown) and a Network Control Gateway (NCG) (not shown).

Additionally, the protocol can permit the VM mobility server 123 to signal the VM mobility occurrence. This protocol can contain the detailed information regarding the VM relocation, such as VM's network address (e.g., Internet Protocol (IP)) and Medium Access Control (MAC) addresses, VM's "before and after" location, VM user locations, VM move duration, any routing performance requirements (bandwidth, latency, affinity, etc.), any security requirements, and etc. Moreover, the protocol can also be used by ACG, NCG, and MVRs to determine if and how MVRs are to be moved/set up in order to optimize the network routing based on the VM new location.

Protocols can be executed by a super-MVR initiating router (MIR) (the physical router that has MVR capabilities), to initiate the forming the single Super-MVR. The MIR can be the MVR enabled physical router or a newly created MVR. The reasons for the super-MVR formation can include but not limit to the following: (1) MIR needs more control plane resources; and (2) MIR needs more forwarding plane resources. Control plane resources, according to certain embodiments, include router CPU cycles and router memory. Forwarding plane resources may include, in some embodiments: MIR I/O ports' throughput from (and/or to) a particular upstream (downstream) router/client node; and MIR switching fabric throughput.

Table 1 further delineates the protocols utilized to manage super-MVRs, as provided below.

TABLE 1

| Protocol | Description |
| --- | --- |
| Resource Announcement Message | For the MIR to announce the minimum amount of additional physical resources needed to continue to operate. |
| Performance Announcement Message | For the MIR to announce the performance requirements. The performance requirements can include but are not limited to the following:<br>a. the minimum available bandwidth between the MIR and the Super-MVR Targeted Routers (MTRs);<br>b. the minimum available bandwidth between the MIR and the MTR(s) on the interface connecting the two routers (directly connected) that is least filled; the minimum available bandwidth between the MIR and the MTR(s) on the path connecting the two routers (indirectly connected) that is least filled;<br>c. the maximum latency allowed between MIR and the MTR(s);<br>d. the maximum jitter allowed between MIR and the MTR(s). |

TABLE 1-continued

| Protocol | Description |
| --- | --- |
| Response Message | MTRs that can meet the SMVR requirements are to respond to the MIR request. Such response can include the details on all the requirement parameters, possibly including information about other concurrent requests received from other MIRs to facilitate race contention resolution. |
| Super-MVR Establishment Message | establish the Super-MVR as requested by the MIR and using the selected MTR(s). The Super-MVR can be formed in two ways:<br>a. between the MIR and a new MVR created on the physical MTR(s);<br>b. between the MIR and the physical MTR(s).<br>include the procedure to identify the control plane processes (e.g., CPU and memory processes) that ought to be shifted from the MIR to the MTR(s), and the mechanism to perform the processes mobility transfer. |
| MIR to MTR Signaling | maintain the Super-MVR and the mobile process exchanges between the MIR and MTR(s) |
| Termination Signaling | move the transferred processes back to the MIR upon the determination by the MIR that the additional resources are no longer needed. These protocols also perform termination of the Super-MVR; and the protocols to terminate the MVR by releasing the unnecessary MTRs; and tearing down the MVRs in the physical MTRs wherever applicable. |

The protocols described above can also add (or remove) multiple MTRs to (from) the same super-MVR either at the same time or over a period of time.

In certain embodiments, a modified IGP protocol is used by the MVR in general (e.g., MVR 103) to announce its existence/formation as well as by an existing MVR to announce its termination to all routers within the network. This protocol can trigger the network optimization process in response to the resulting change of network topology.

Furthermore, the protocol can be utilized by the VM mobility server 123 to signal the end of session of the relocated VM to a number of network/cloud modules. These modules, in some embodiments, include ACG, NCG, and MVRs, and can determine if existing MVRs need to be torn down or not. This protocol can also contain the detailed information regarding the VM that is being terminated or relocated.

As seen in FIG. 2B, the described protocols can be used to execute process 250. By way of explanation, process 250 is described with respect to the super-MVR 200 of FIG. 2. In step 251, process 250 selects two or more physical routers 115 and 117 based on, for instance, the resource capacity and/or availability of these routers 115 and 117. It is contemplated that any number of physical routers can be used and that other criteria can be applied for the selection process. In step 253, the resources of the selected routers 115 and 117 are then effectively pooled—i.e., configured to be availability to the super-MVR that is formed (per step 255).

Figure 3:
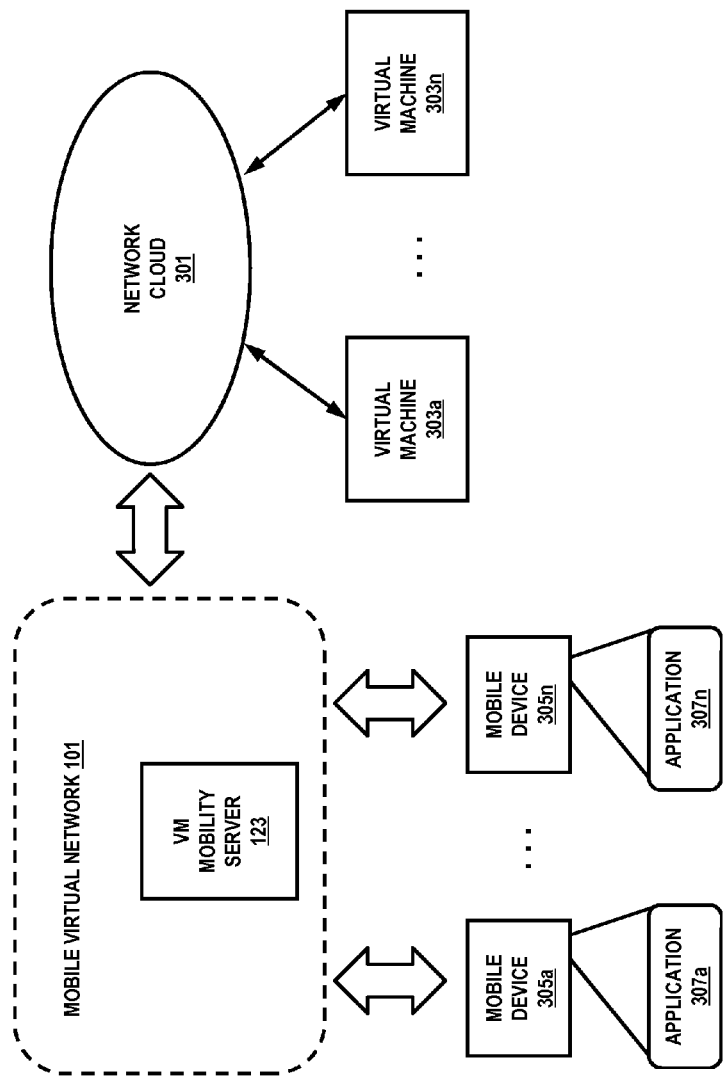
FIG. 3 is a diagram of a mobile virtual network supporting services of a network cloud, according to one embodiment.

FIG. 3 is a diagram of a mobile virtual network 101 supporting services of a network cloud, according to one embodiment. Mobile virtual network 101, according to certain embodiments, can support cloud computing services and applications via network cloud 301. As mentioned, mobile virtual routers (MVR), including one or more super-MVRs, can be dynamically self-configured to support cloud computing applications ("the cloud"). MVR can be set up and torn down dynamically via MVR signaling protocols. The described processes and arrangement allow the MVR to play a vital role in the cloud infrastructure to improve efficiency and performance by offering a flexible router provisioning mechanism in the network that best matches the cloud requirements. As noted, one major characteristic of the cloud is that both the application server (running on virtual machines or VMs) and application client (running on the user device) are mobile. In this architecture, the only static parts or components are the network resources and routers. By being static, the network resources may not be efficiently utilized to support the mobility of the cloud services, and in some cases, they may not even meet the cloud application requirements.

As shown, mobile virtual network 101 can employ VM mobility server 123 to manage virtual machines 303a-303n. In this example, mobile devices 305a-307n can execute respective applications 307a-307n to interact with the virtual machines 303a-303n. These applications 307a-307n, according to certain embodiments, may require constant mobility of virtual machines 303a-303n that are dedicated to their support. One example of such applications 307a-307n is a multiparty interactive application, e.g., game simulator with thousands/millions of users/players participating from many locations. The game or application can be continually executing (e.g., running 24-7), whereby users can be active or inactive based on their interest and time availability. Depending on the game dynamics and users' participation patterns, the network 101 may experience waves of active users, who are moving geographically according to time zones. This wave of active users is likely to require a continuous migration of VMs to efficiently run the game; possibly choosing VM locations that are in proximity of large pockets of active users for the best time response. With this continuous VMs migration, the mobile virtual network 101, which is established to support the application, may be constantly mutated to best match the moving entities, i.e., the pattern of active users and locations of VMs 303a-303n.

Figure 4:
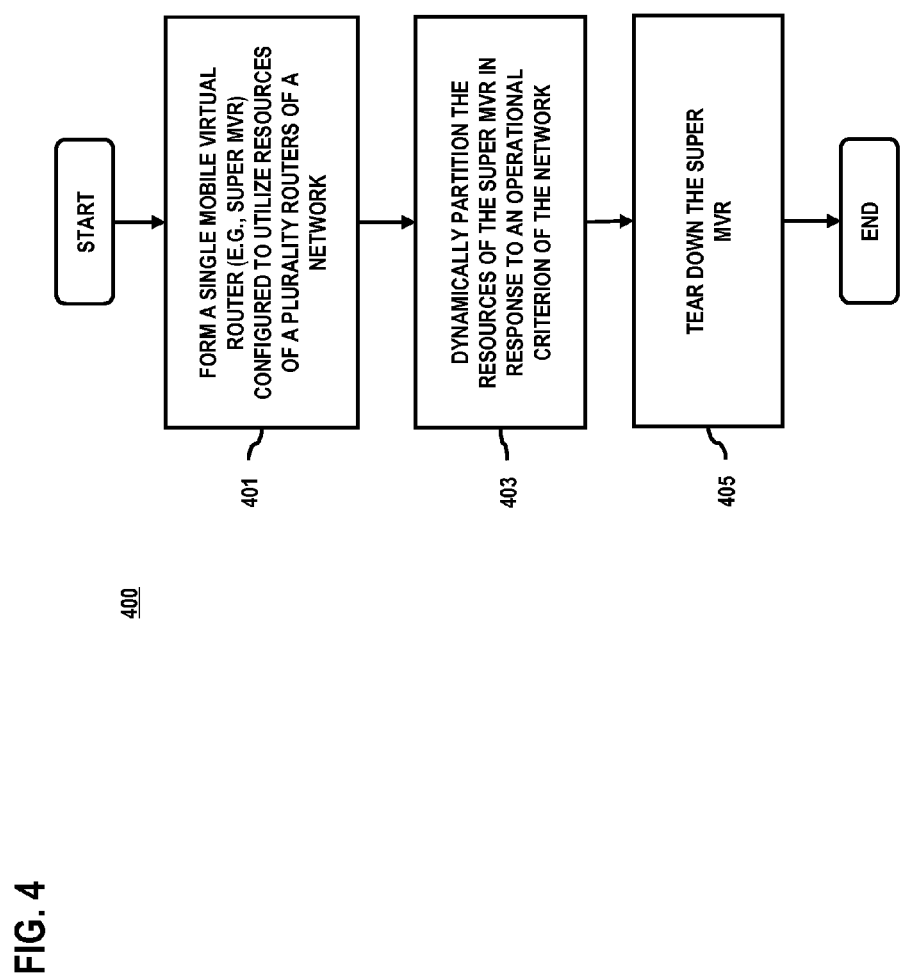
FIG. 4 is a flowchart of a process for sharing router resources via a super mobile virtual router, according to one embodiment.

FIG. 4 is a flowchart of a process for sharing router resources via a super mobile virtual router, according to one embodiment. For illustrative purpose, process 400 is described with respect to the system of FIG. 1. It is noted that the steps of process 400 may be performed in any suitable order, as well as combined or separated in any suitable manner. In step 401, process 400 forms a single mobile virtual router (e.g., super MVR 105) configured to utilize resources of multiple routers (e.g., physical routers 115 and 117) of network 113. It is contemplated that the designated routers may include one or more physical routers, one or more virtual routers (not shown), one or more other mobile virtual routers (e.g., routers 103, 107, 109, and 111), or a combination thereof. Next, in step 403, the resources of the single mobile virtual router are dynamically partitioned in response to an operational criterion of the network 101 (per step 403). Such operational criterion may be based on application requirements and/or network performance requirements, for instance. The partitioned resources represent the collective pooled resources of the designated routers 115 and 117. Subsequently, in step 405, the created super mobile virtual router can be torn down, which may effectively release the resources.

Figure 5:
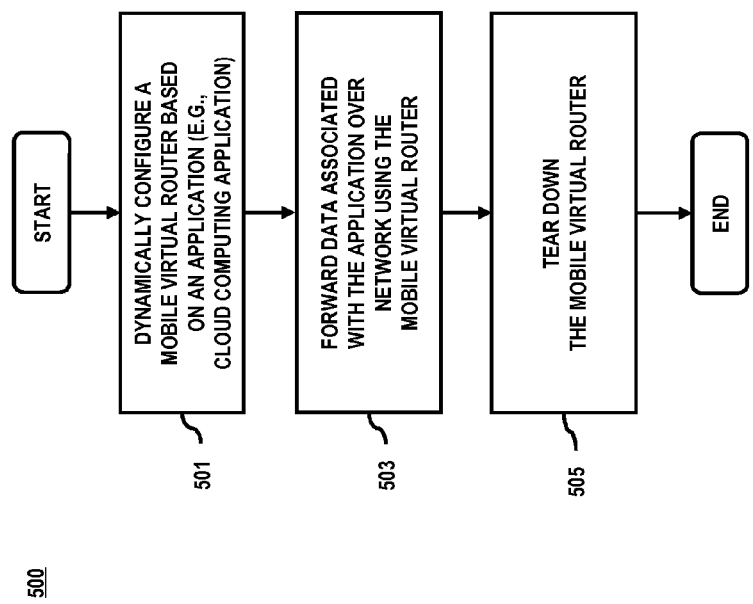
FIG. 5 is a flowchart of a process for dynamically configuring a mobile virtual router, according to one embodiment.

FIG. 5 is a flowchart of a process for dynamically configuring a mobile virtual router, according to one embodiment. For illustrative purpose, process 500 is described with respect to the system of FIG. 1. It is noted that the steps of process 500 may be performed in any suitable order, as well as combined or separated in any suitable manner. In step 501, process 500 involves dynamically configuring a mobile virtual router (e.g., router 103) based on an application. According to certain embodiments, the application is a cloud computing application. Process 500 then forwards data associated with the application over the network using the mobile virtual router, as in step 503. In one embodiment, the control plane instance, the forwarding plane instance, and the management plane instance are moveable among the physical routers. In step 505, the mobile virtual router is torn down.

It is contemplated that the resources of the physical routers of network 113 can be utilized simultaneously. Moreover, the control plane instance, the forwarding plane instance, and the management plane instance can be removed from one physical router and replicated on a different one of the physical routers. In this manner, the mobile virtual router can be relocated from one physical router to another physical router. According to one embodiment, a control signal can be generated to indicate of end of session of the relocation for transmission to a cloud module.

Figure 6:
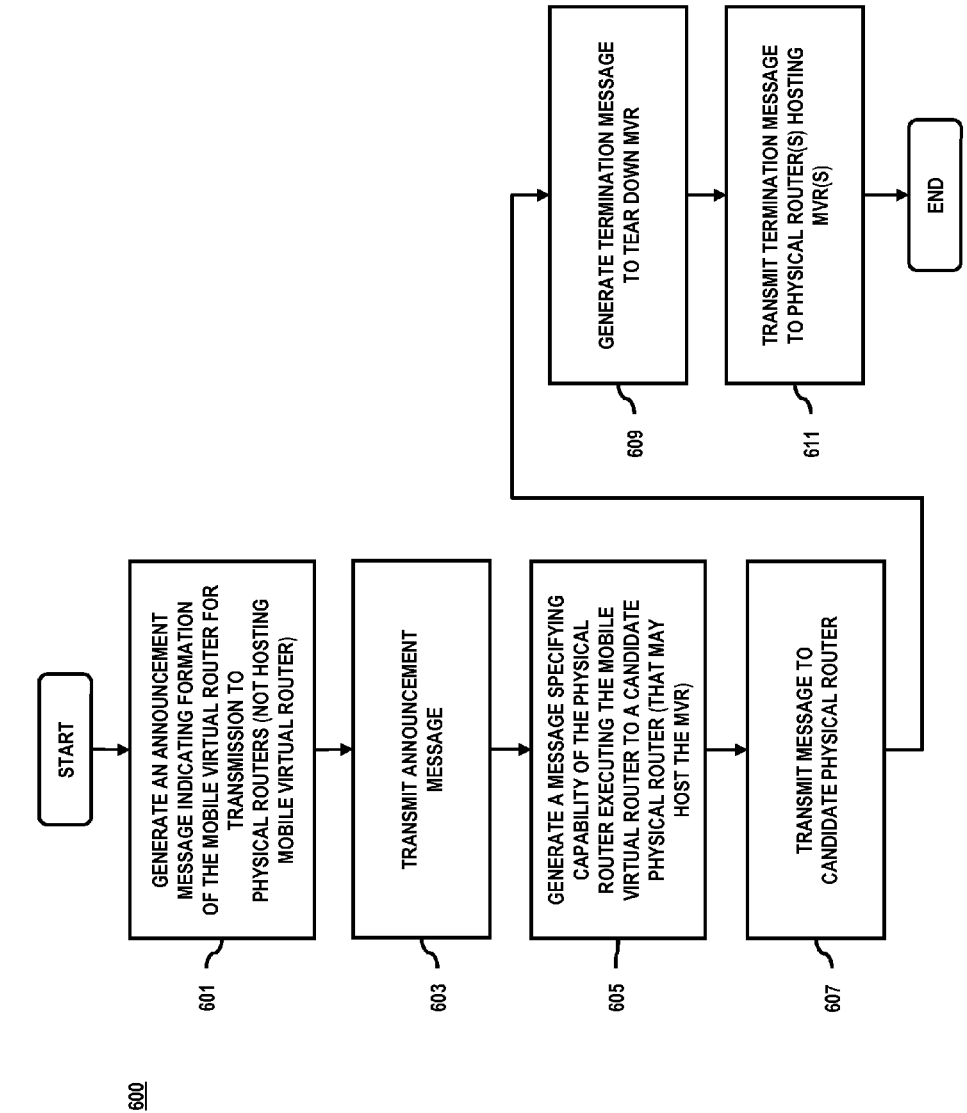
FIG. 6 is a flowchart of a process for notifying a candidate physical router to execute a mobile virtual router, according to one embodiment.

FIG. 6 is a flowchart of a process for notifying a candidate physical router to execute a mobile virtual router, according to one embodiment. It is noted that the steps of process 600 may be performed in any suitable order, as well as combined or separated in any suitable manner. In step 601, process 600 involves generating an announcement message indicating formation of the mobile virtual router (e.g., MVR 103 of FIG. 1). The announcement message is transmitted, per step 603, to a physical router that is not currently hosting the MVR. In one embodiment, process 600 also involves determining the capacity of a particular physical router. Accordingly, in step 605, an appropriate message is generated, whereby the message specifies capability of one of the physical routers 115-121 (executing the mobile virtual router; e.g., physical router 115) to another one of the physical routers 115-121. The other one of the physical router (e.g., router 117) is a candidate to host the mobile virtual router. Thus, in step 607, the message pertaining to the router capacity is forwarded to the candidate physical router 117.

After the MVR is established, at some point, the MVR can be torn down to free or reallocate resources. This tear down procedure, in certain embodiments, can be initiated by the generation of a termination message to tear down the MVR (step 609). Thereafter, the termination message is supplied to the appropriate physical router 117 that is hosting the MVR (step 611).

Figure 7:
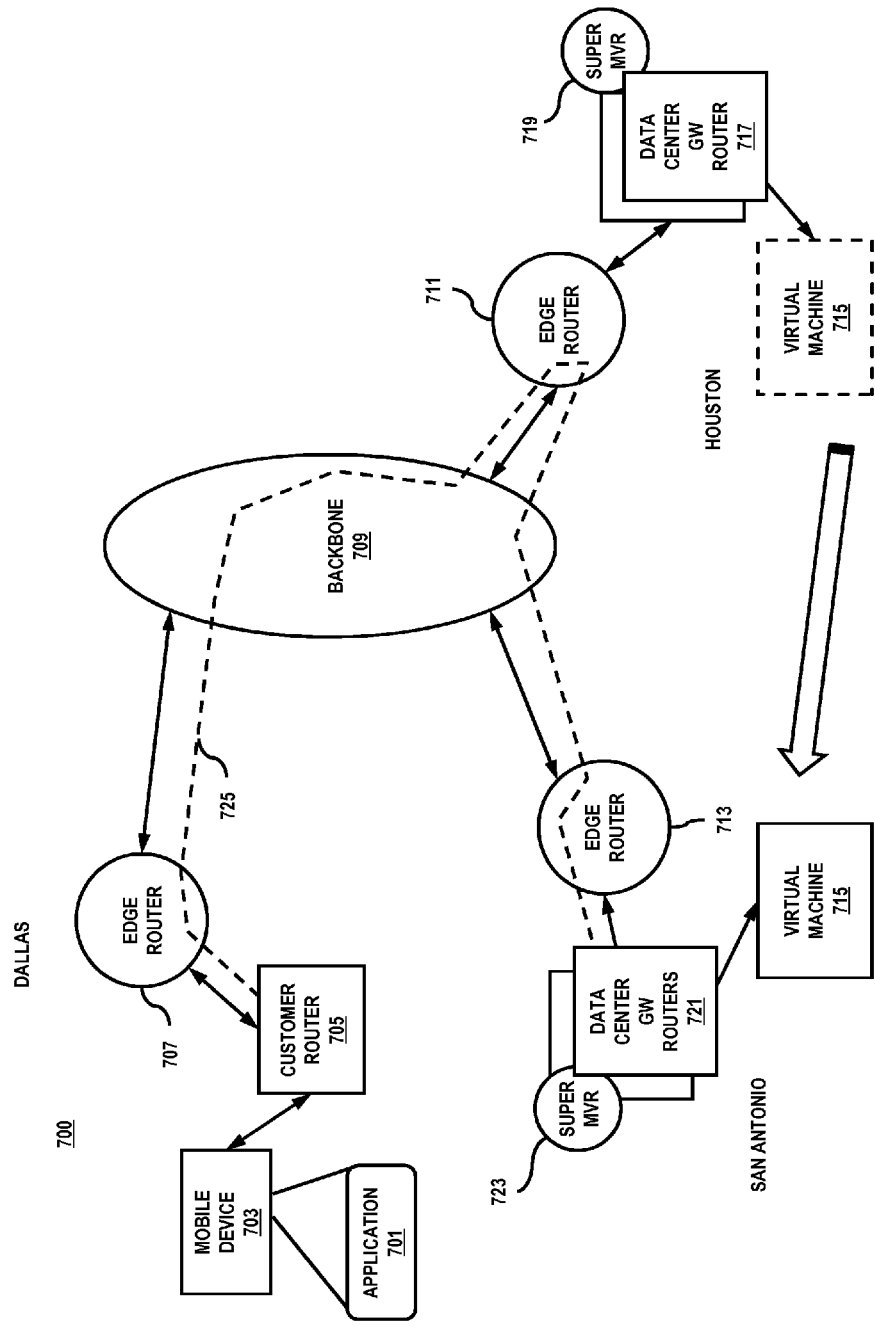
FIG. 7 is a diagram of an exemplary system with mobile deployment, according to one embodiment.

FIG. 7 is a diagram of an exemplary system with MVR deployment, according to one embodiment. By way of example, system 700 involves a user application 701 residing within a mobile device 703 at a first geographic location, e.g., the city of Dallas. At this location is a customer router 705, which interfaces with a cloud service provider (CSP) edge router 707 that provides connectivity to a backbone or core network 709. In this example, the backbone network 709 serves two other locations, Houston and San Antonio, using edge routers 711 and 713, respectively. Edge router 711 at Houston provides connectivity to an application server (e.g., VM 715) via multiple data center gateway routers 717. According to one embodiment, a super-MVR 719 is executed on routers 717. Similarly, at the San Antonio site, edge router 713 interfaces with data center gateway routers 721, which form a super MVR 723. Under this scenario, the user application 701 is accessing application server (e.g., VM 715) residing in the data center server of the Houston site.

Due to some circumstances, the data center operator must move the VM 715 from the Houston data center to the San Antonio data center during service. In this case, the data flow from the user device to the VM will likely go through the following route 725: customer router 705 in Dallas to CSP edge router 707 in Dallas to CSP backbone 709 between Dallas and Houston to CSP edge router 711 in Houston to CSP data center gateway router 717 to CSP edge router 711 in Houston to CSP backbone 709 between Houston and San Antonio to CSP edge router 713 in San Antonio to CSP data center gateway router 721 in San Antonio.

This route 725, which exhibits a type of zig-zag routing problem induced by the VM mobility, can add significant end-to-end latency and un-necessary traffic load in the CSP backbone 709. To address this problem, one approach is to create super MVRs 719 and 723 running on the data center gateway routers 717 and 721, respectively. When VM 715 is relocated, the super MVR 719 in data center gateway routers 717 associated with the VM 715 is also moved to new physical data center gateway routers 721. In that case, the routing tables of CSP edge routers 707, 711, and 713 are then updated based on the new customer edge (CE) router (MVR) reachability. The end-to-end application-server routes are thus re-optimized upon completion of the VMs relocation.

The processes described herein for forming of a single mobile virtual router spanning across more than one physical router may be implemented via software, hardware (e.g., general processor, Network Processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
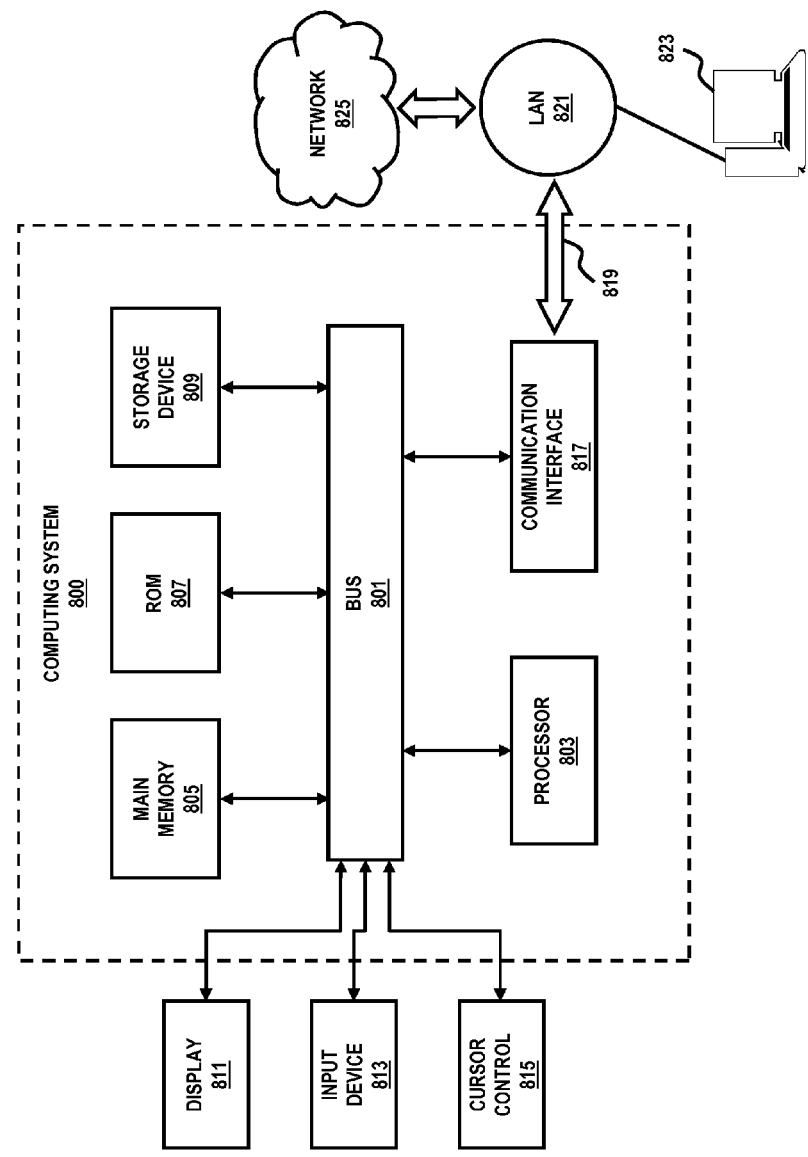
FIG. 8 is a diagram of a computer system that can be used to implement various exemplary embodiments.

FIG. 8 illustrates computing hardware (e.g., computer system) 800 upon which exemplary embodiments can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a broadband connection or a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
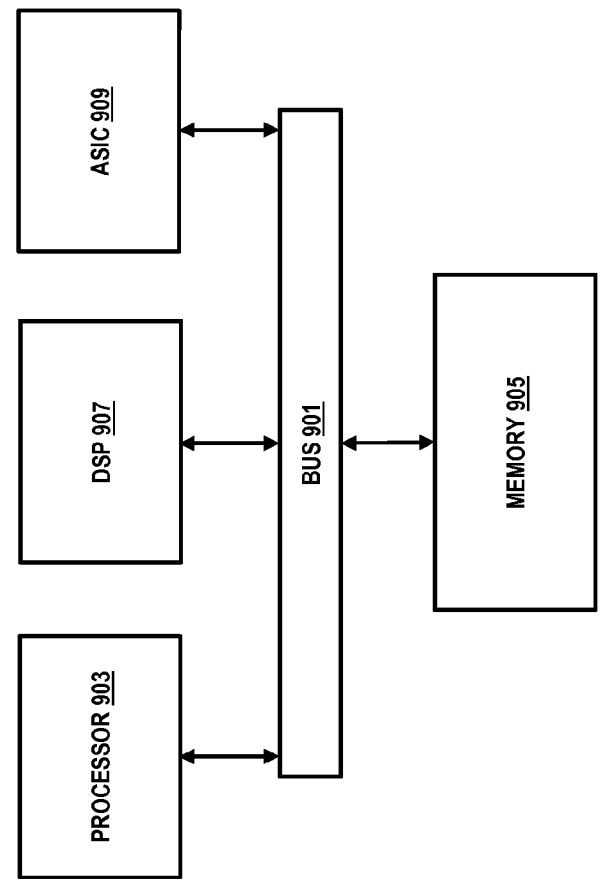
FIG. 9 is a diagram of a chip set that can be used to implement various exemplary embodiments.

FIG. 9 illustrates a chip set 900 upon which an embodiment of the invention may be implemented. Chip set 900 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 2B, and 4-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to providing notification of a change in path condition. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   forming a single mobile virtual router configured to utilize resources of a plurality of routers of a network, wherein the routers include one or more physical routers, one or more virtual routers, one or more other mobile virtual routers, or a combination thereof; and
   dynamically partitioning the resources of the single mobile virtual router in response to an operational criterion of the network, wherein the single mobile virtual router is a single control entity for the partitioned resources of each of the plurality of routers executing the single mobile virtual router,
   wherein the single mobile virtual router includes a control plane instance, a forwarding plane instance, and a management plane instance; each of the instances being moveable among the one or more physical routers.

2. A method according to claim 1, further comprising:
   generating a message specifying capability of one of the one or more physical routers executing the single mobile virtual router to another one of the one or more physical routers, wherein the other one of the one or more physical routers is a candidate to host the single mobile virtual router.

3. A method according to claim 1, further comprising:
   generating an announcement message to announce a minimum amount of additional physical resources needed to continue to operate the network.

4. A method according to claim 1, further comprising:
   generating a message to announce performance requirements of the network.

5. A method according to claim 1, further comprising:
   tearing down the single mobile virtual router.

6. An apparatus comprising:
   at least one processor; and
   at least one memory including computer program code for one or more programs,
   the at least one memory and the computer program code configured to, with the at least one processor, cause the apparatus to perform at least the following,
   form a single mobile virtual router configured to utilize resources of a plurality routers of a network, wherein the routers include one or more physical routers, one or more virtual routers, one or more other mobile virtual routers, or a combination thereof, and
   dynamically partition the resources of the single mobile virtual router in response to an operational criterion of the network, wherein the single mobile virtual router is a single control entity for the partitioned resources of each of the plurality of routers executing the single mobile virtual router,
   wherein the single mobile virtual router includes a control plane instance, a forwarding plane instance, and a management plane instance; each of the instances being moveable among the one or more physical routers.

7. An apparatus according to claim 6, wherein the apparatus is further caused to:
   generate a message specifying capability of one of the one or more physical routers executing the single mobile virtual router to another one of the one or more physical routers, wherein the other one of the one or more physical routers is a candidate to host the single mobile virtual router.

8. An apparatus according to claim 6, wherein the apparatus is further caused to:
   generate an announcement message to announce a minimum amount of additional physical resources needed to continue to operate the network.

9. An apparatus according to claim 6, wherein the apparatus is further caused to:
   generate a message to announce performance requirements of the network.

10. An apparatus according to claim 6, wherein the apparatus is further caused to:
    tear down the single mobile virtual router.

11. A system comprising:
    a plurality routers of a network, wherein a single mobile virtual router, formed by the routers, is configured to utilize resources of the routers, wherein the routers include one or more physical routers, one or more virtual routers, one or more other mobile virtual routers, or a combination thereof,
    wherein the single mobile virtual router is a single control entity for the resources of the routers, and
    wherein the resources of the single mobile virtual router are dynamically partitioned in response to an operational criterion of the network,
    wherein the single mobile virtual router includes a control plane instance, a forwarding plane instance, and a management plane instance; each of the instances being moveable among the one or more physical routers.

12. A system according to claim 11, wherein a message is generated, the message specifying capability of one of the one or more physical routers executing the single mobile virtual router to another one of the one or more physical routers, wherein the other one of the one or more physical routers is a candidate to host the single mobile virtual router.

13. A system according to claim 11, wherein an announcement message is generated to announce a minimum amount of additional physical resources needed to continue to operate the network.

14. A system according to claim 11, wherein a message is generated to announce performance requirements of the network.

15. A system according to claim 11, wherein the single mobile virtual router is torn down.

16. A system according to claim 11, further comprising:
a mobility server configured to assist with a tear down of the single mobile virtual router.

17. A system according to claim 11, wherein an establishment of the single mobile virtual router is requested by an initiating mobile virtual router.

* * * * *